P. PLEISS.
WELDING TIP.
APPLICATION FILED MAR. 24, 1913.

1,107,346.

Patented Aug. 18, 1914.

Witnesses:
G. W. Omarus Jr.
R. Bauerle

Inventor:
Paul Pleiss
By Samuel E. Darby
Atty

UNITED STATES PATENT OFFICE.

PAUL PLEISS, OF CHICAGO, ILLINOIS, ASSIGNOR TO DAVIS-BOURNONVILLE COMPANY, OF NEW YORK, N. Y., AND CHICAGO, ILLINOIS, A CORPORATION OF NEW YORK.

WELDING-TIP.

1,107,346.  Specification of Letters Patent.  Patented Aug. 18, 1914.

Application filed March 24, 1913.  Serial No. 756,335.

*To all whom it may concern:*

Be it known that I, PAUL PLEISS, a citizen of the United States, residing at Chicago, county of Cook, State of Illinois, have made a certain new and useful Welding-Tip, of which the following is a specification.

This invention relates to welding tips, and particularly to tips of the class wherein a cooling medium is circulated around the tip for the purpose of maintaining the same cool.

The object of the invention is to provide a construction of tip of the nature referred to which is simple and efficient, and wherein soldered joints between the parts are avoided.

A further object is to provide a tip of the character referred to with a removable and replaceable point, and to utilize said removable point in retaining the jacket which forms the cooling chambers in place.

The invention consists substantially in the construction combination, location and relation of parts, all as will be more fully hereinafter set forth, as shown in the accompanying drawing and finally pointed out in the appended claims.

Figure 1:
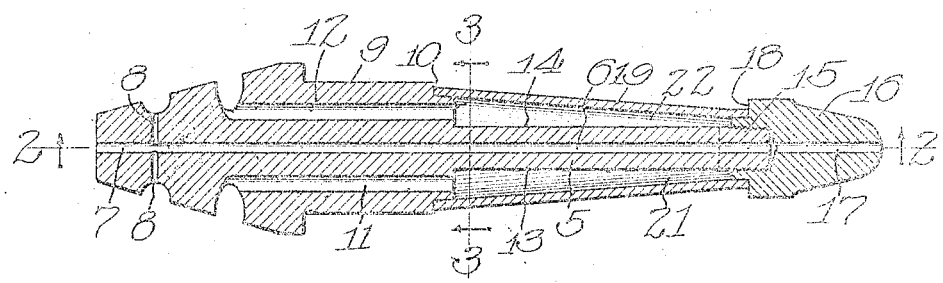
Figure 2:
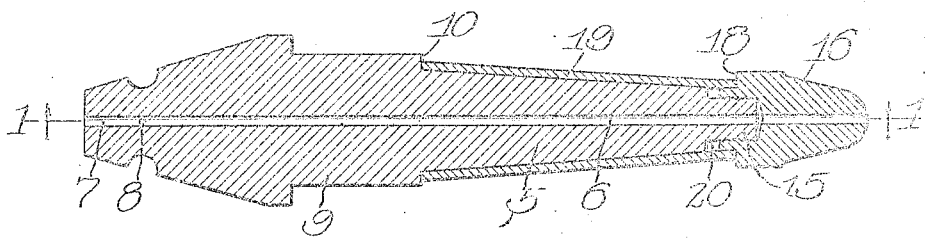
Figure 3:
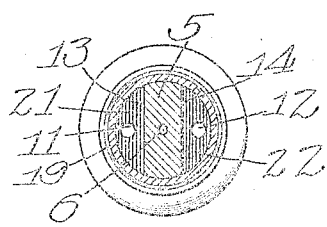

In the drawing:—Figure 1 is a view in central longitudinal section on the line 1, 1, Fig. 2, of a welding tip embodying the principles of my invention. Fig. 2 is a longitudinal sectional view of a welding tip embodying the principles of my invention. Fig. 3 is a transverse section on the line 3, 3, Fig. 1.

In the drawing 5 is the body of the tip which is formed with the usual longitudinal bore 6, for the passage of the gas mixture therethrough, the constituent gases entering said bore through the openings 7, 8, respectively. The tip body is formed with an enlarged part 9, which is turned down at one end to form a shoulder 10. This enlarged part is also formed with the inlet and outlet ducts 11, 12, for a cooling medium. The body 5, from the shoulder 10 to its extremity has the opposite side surfaces thereof, milled off, as shown at 13, 14, and at its extreme end the body is reduced in external diameter, as shown at 15, and this reduced portion is exteriorly threaded. Upon this threaded portion is received a removable point 16, which is formed with an interiorly threaded socket to screw onto the threaded reduced end of the body, and also with a longitudinal duct 17, forming a prolongation of the gas bore 6. The point 16 on its inner face is reduced to form a shoulder 18. A jacket 19 in the form of a sleeve is fitted over the milled portion of the tip body, one end thereof being received against the shoulder 10, and the other end being engaged by the shoulder 18 on the removable point, when the latter is turned up thereagainst, whereby said sleeve is firmly clamped in place between said shoulders 10, 18, and held in place with water tight joints. When the removable point is turned up to effect the clamping of the sleeve 19, in position, the inner face of said point does not cover the entire length of the reduced threaded portion 15, as clearly shown, thereby leaving an annular passage 20. It will be seen that the jacket 19 coöperating with the milled surfaces 13, 14, of the tip body forms two separated water tight chambers 21, 22, which, however, communicates with each other at one end through the annular passage 20. At their other ends the ducts 11, 12, respectively communicate with the chambers 21, 22.

A construction of welding tip such as above described affords a simple and efficient means for maintaining the tip cool, the gas mixture uniform and the flame steady and constant. The cooling medium such, for example, as water, is admitted through the duct 11, say, and flows into the chamber 21, through the annular passage 20 into chamber 22, and out through the duct 12.

It will be observed that I avoid the necessity of employing soldered joints which are liable to become loose and leak, particularly where such joints are close to the extremity of the tip where the flame is maintained, for, in use, it is not unusual for small particles of the metals and oxids to adhere to the surface of the tip at the point where the flame is maintained when the tip is in use thereby necessitating the frequent removal of such particles by filing them off, or otherwise removing them, and such filing is liable to impair the soldered joint of the parts if any there be contiguous thereto.

In practice I prefer to make the point portion 16 of a material which possesses a high coefficient of heat conductivity so that the heat thereof when the tip is in use may be readily conducted to the cooled portion of the tip and absorbed by the cooling medium. I also prefer to employ a material to which hot iron or other metallic oxids will not readily adhere. I have found German silver, copper, aluminum bronze and other similar metals to be satisfactory for the purpose.

A tip having the structure and characteristics above set forth, while efficient for welding purposes is equally useful for other purposes, as cutting, soldering or the like.

Having now set forth the objects and nature of my invention and a construction embodying the principles thereof, what I claim as new and useful and of my own invention, and desire to secure by Letters Patent is,—

1. In a welding tip, a body portion having a shoulder, a jacket surrounding a portion of the body part, and a removable point for clamping said jacket endwise against said shoulder.

2. In a welding tip, a body portion having a shoulder, the opposite sides of said body being cut away to form separated spaces, a jacket surrounding said cut away part to form said spaces into a separated chamber, and means adjustable on the body portion for clamping said jacket endwise against said shoulder.

3. In a welding tip, a shouldered body portion having a threaded extremity, a removable point applied thereto, a jacket surrounding a portion of the body portion and forming therewith separated chambers, inlet and outlet ducts communicating respectively with said chambers, said chambers also communicating with each other, said point serving to clamp the jacket endwise against the shoulder on the body portion.

4. In a welding tip, a shouldered body portion having a reduced extremity, a removable point embracing a portion only of said reduced extremity, a jacket inclosing said body part and forming therewith separated chambers on opposite sides thereof, said point serving to clamp the jacket in place, and inlet and outlet ducts respectively communicating with said chambers.

In witness whereof I have hereunto set my hand this 15th day of March, 1913, in the presence of the subscribing witnesses.

PAUL PLEISS.

Witnesses:
 ERNEST H. JOHNSON,
 N. B. PAYNE.